Aug. 17, 1965   O. F. COLBERT   3,200,531
BAITED-HOOK CARRIER
Filed Jan. 7, 1963
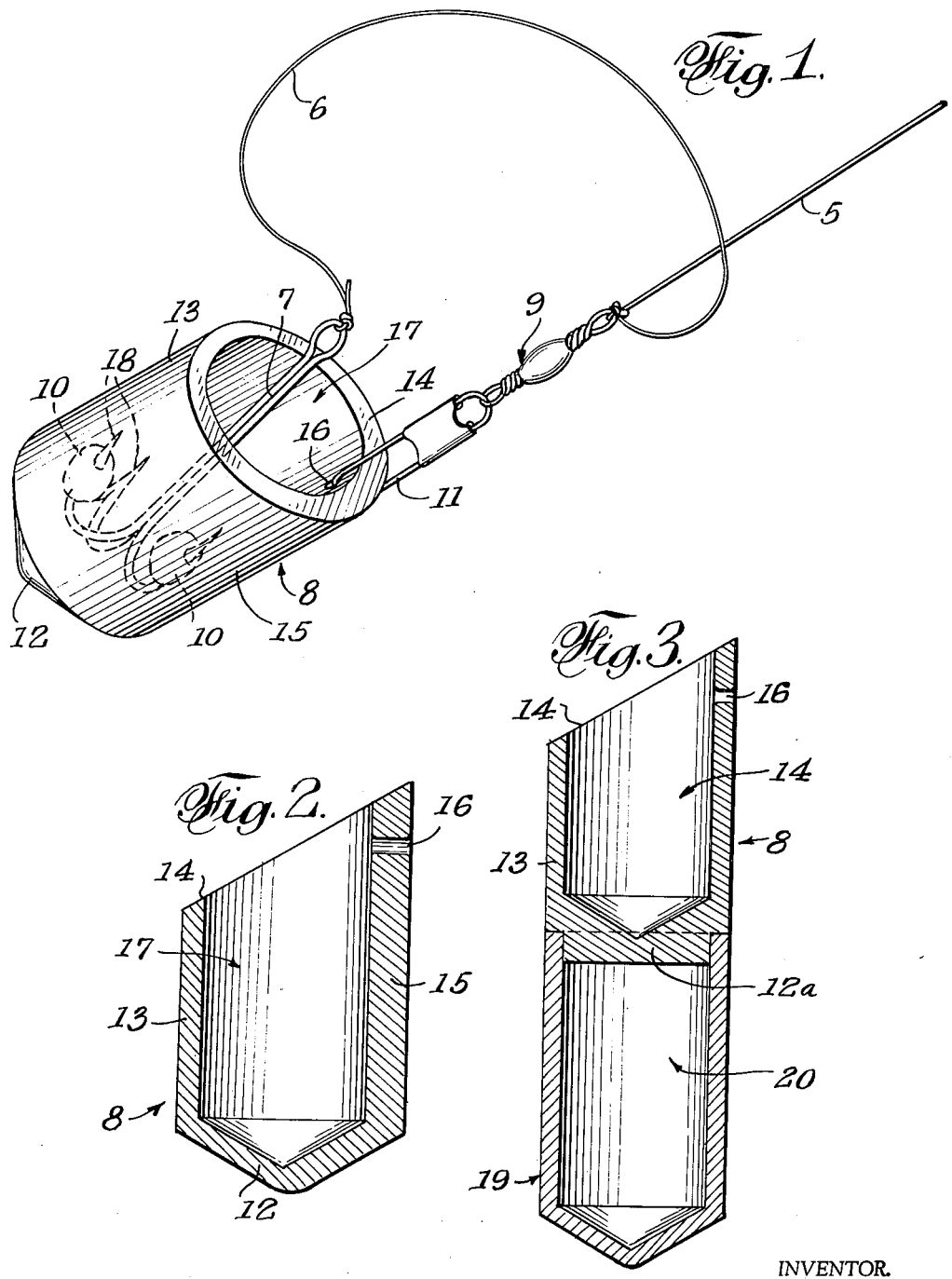
INVENTOR.
OTTO F. COLBERT
BY C. G. Stratton
ATTORNEY

United States Patent Office 3,200,531
Patented Aug. 17, 1965

3,200,531
BAITED-HOOK CARRIER
Otto F. Colbert, 10107 Adella Ave., Whittier, Calif.
Filed Jan. 7, 1963, Ser. No. 249,619
3 Claims. (Cl. 43—41.2)

This invention relates to a carrier for a baited fishhook and has for an object to provide means that combines a sinker or float and a bait-conserving element.

When casting with hooks baited with fish eggs and other small, lightweight and easily destructible bait, the force of the cast or the impact of the baited hook on the surface of the water, or both, frequently cause the bait to be dislodged or fall from the hook and become lost. The angler has no way of knowing of such a condition, since the hook most frequently is too distant for determination whether or not the bait is still on the hook.

Accordingly, another object of the invention is to provide means that protects the bait on a hook from dislodgement due to both centrifugal casting force and impact with the water surface, and which sinks or falls away from the baited hook at the end of the cast to expose the bait on the hook barbs to lure fish.

Another object of the invention is to provide a combination of a fishhook on a leader and either a sinker or float in which the hook is housed during a cast for the purpose of preventing loss of the bait on the hook barbs.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a perspective view of means including a baited-hook carrier according to the present invention.

FIG. 2 is a longitudinal sectional view of the carrier shown in FIG. 1.

FIG. 3 is a similar view of a modification.

The means of the present invention is connected to a fish line 5 and is shown as comprising a leader 6, a fishhook 7 on the end of said leader, and a carrier 8, connected by articulate means 9 to the fish line 5 to house said hook and items of bait 10 thereon.

As can be seen in FIG. 1, the leader 6 is substantially longer than is the connection 9 having a fixed maximum length so that, when the latter is drawn taut, the leader is slack when the hook 7 is disposed in the carrier 8. While the connection 9 is shown as formed of link-connected elements terminating in a loop 11, the same may include a length of line in addition to such elements. In any case, the hook 7 is connected to a longer flexible member 6 than the flexible member to which the carrier is connected.

According to the present invention, the carrier 8 comprises a cup member having a bottom 12 from which extends a cylindrical wall 13 that may be normal at its upper open end or may terminate at a sloping end face 14, as shown. Also, the wall 13 may be thicker and, thus, more weighted on one side, as at 15, and it is on tht side that a hole 16 is provided for the loop 11. The slope of end face 14 is in a direction downwardly from the thicker side 15 of the cup wall affording more ready access for the hook 7 and also permitting of the freer release or disengagement of the hook from the cup. It will be clear that the sloping end of the cup creates a larger opening than the diametral size of the cup interior 17, yet said interior may be proportioned with respect to the size across the barbs 18 of the hook 7 to loosely, yet effectively, retain the hook in the space 17 so there is but a minimum of shock-prooducing movement between the hook and the cup.

In practice, after the hook barbs 18 are baited, the hook is loosely dropped into the interior space 17 in the manner shown. Now, when the cast is made, the member 8 will be subject to the centrifugal forces generated, while the leader 6 remains slack so the hook is free to center itself in the cup interior. Near the end of the cast, the cup will drop, open end down, onto the water and the baited hook will fall out of the cup, as water displaces the air in the cup, with but little force that may tend to impose dislodging or disrupting forces on the bait 10. The cup may strike the water in different ways, depending on the trajectory of the cast, but in any case will enter the water with its end 14 down. Since, in this position, the cup interior quickly fills with water, there is a short period of time where the sinking tendency of the cup is retarded, allowing the hook to fall away from the cup, as explained.

Also, the hook 7 is in an inverted position with the barbs 18 thereof downwardly directed. Therefore, the small impact on the bait 10 that may be present acts to push the bait onto the barbs rather than trying to dislodge them, as in cases where the hook is free and may strike the water straight up.

In the above manner, lightweight and fragile bait 10 is prevented from either becoming dislodged from the barbs 18 or becoming so disrupted as to fall away from the barbs.

The above-described cup 8 constitutes a sinker that draws the baited hook 7 to the bottom. As shown in FIG. 3, the same may be converted into a float or bobber by attaching a second cup 19 to the bottom 12a of the cup 8.

The attachment may be made by means of a force fit, by a threaded connection between the two cups, or in other desirable ways. Of course, a float with a hook-accommodating interior space 17 may be made in integral form, by providing the same with a buoyancy chamber 20.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. In combination,
   (a) a leader on the end of a fish line,
   (b) a bait hook on the end of the leader,
   (c) a cup member comprising a sinker and having an interior space in which the hook, when baited, is adapted to be disposed, and
   (d) a connection having a fixed maximum length between the cup member and the fish line shorter than the leader, said connection, when pulled by the cup member when the latter is sinking in water into which cast, drawing on the leader and the baited hook thereon in a direction toward the bottom of the water.

2. In combination,
   (a) a leader on the end of a fish line,
   (b) a bait hook on the end of the leader,
   (c) a cup member comprising a sinker and having an interior space in which the hook, when baited, is adapted to be disposed, and (d) a connection having a fixed maximum length between the open end of the cup member and the fish line that is shorter than the leader and which retains the cup with its bottom outward during a casting operation, said connection, when pulled by the cup member when the latter is sinking in water into which cast, drawing on the leader and the baited hook thereon in a direction toward the bottom of the water.

3. In combination,
   (a) a sinker in the form of a non-buoyant cup,
   (b) means having a fixed maximum length connecting said sinker to the end of a fish line,
   (c) a leader with a bait hook thereon, connected to the fish line, the hook, when baited, being relatively lighter and more buoyant than the sinker and being adapted to be disposed in the hollow of the sinker,
   (d) said sinker cup constituting a carrier for the baited hook during casting thereof into water to protect the bait from destructive impact with the water,
   (e) the baited hook dropping from the sinker cup into the water as water displaces the air in the cup after the cast, and
   (f) the water-filled sinker cup, being substantially heavier than the baited hook, sinking in the water toward the bottom to pull on the leader and draw the baited hook to the bottom.

References Cited by the Examiner
UNITED STATES PATENTS

| | | | |
|---|---|---|---|
| 1,128,205 | 2/15 | White | 43—41.2 |
| 1,915,208 | 6/33 | Walthers | 43—41.2 |
| 2,554,318 | 5/51 | Wardrip et al. | 43—41.2 |
| 2,629,198 | 2/53 | Johnston | 43—41.2 |
| 2,840,945 | 7/58 | Sealock | 43—41.2 |
| 2,910,798 | 11/59 | Bias | 43—41.2 |
| 2,914,883 | 12/59 | Kustusch | 43—41.2 |

SAMUEL KOREN, *Primary Examiner.*

UNITED STATES PATENT OFFICE
CERTIFICATE OF CORRECTION

Patent No. 3,200,531

August 17, 1965

Otto F. Colbert

It is hereby certified that error appears in the above numbered patent requiring correction and that the said Letters Patent should read as corrected below.

In the heading to the printed specification, line 3, for "10107 Adella Ave., Whittier, Calif." read -- 6309 South Pickering Ave., Whittier, Calif. --.

Signed and sealed this 20th day of August 1968.

(SEAL)
Attest:

Edward M. Fletcher, Jr.
Attesting Officer

EDWARD J. BRENNER
Commissioner of Patents